US012574404B2

(12) United States Patent
Wang et al.

(10) Patent No.: US 12,574,404 B2
(45) Date of Patent: Mar. 10, 2026

(54) METHODS AND APPARATUS FOR ENHANCED SECURITY IN FEDERATED LEARNING MACHINE LEARNING OPERATIONS IN A COMMUNICATION NETWORK

(71) Applicant: InterDigital Patent Holdings, Inc., Wilmington, DE (US)

(72) Inventors: Zhibi Wang, Woodridge, IL (US); Morteza Kheirkhah, London (GB); Alec Brusilovsky, Downingtown, PA (US); Ulises Olvera-Hernandez, Saint-Lazare (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 44 days.

(21) Appl. No.: 18/834,858

(22) PCT Filed: Jan. 31, 2023

(86) PCT No.: PCT/US2023/011933
§ 371 (c)(1),
(2) Date: Jul. 31, 2024

(87) PCT Pub. No.: WO2023/150094
PCT Pub. Date: Aug. 10, 2023

(65) Prior Publication Data
US 2025/0168187 A1 May 22, 2025

Related U.S. Application Data

(60) Provisional application No. 63/305,941, filed on Feb. 2, 2022.

(51) Int. Cl.
*H04L 9/40* (2022.01)

(52) U.S. Cl.
CPC ...... *H04L 63/1433* (2013.01); *H04L 63/1425* (2013.01)

(58) Field of Classification Search
CPC ............. H04L 63/1433; H04L 63/1425; G06F 21/577; G06N 20/00
See application file for complete search history.

(56) References Cited

U.S. PATENT DOCUMENTS

| | | | |
|---|---|---|---|
| 2019/0042937 A1* | 2/2019 | Sheller | ..................... G06N 3/09 |
| 2021/0097541 A1* | 4/2021 | Nanduri | ................. G06Q 40/03 |

(Continued)

FOREIGN PATENT DOCUMENTS

| | | | | |
|---|---|---|---|---|
| CN | 113688387 A | 11/2021 | | |
| CN | 118174951 A * | 6/2024 | ........... | G06F 18/241 |

(Continued)

OTHER PUBLICATIONS

CN 113688387 A, English language machine translation, 21 pages.

*Primary Examiner* — Sarah Su
(74) *Attorney, Agent, or Firm* — Mark D. Pratt

(57) ABSTRACT

The disclosure pertains to methods and apparatus for federated learning (FL) artificial intelligence machine learning (AIML) implemented in a first security entity associated with a Wireless Transmit/Receive Unit (WTRU), the method comprising: obtaining, by the first security entity, first information indicating security assessment data of the WTRU in a federated learning network; determining, by the first security entity, based on the security assessment data, an indication of a security vulnerability of a trained FL AIML intermediate model; sending based on the determined indication of the security vulnerability, by the first security entity to a second security entity associated with a network node, second information indicating the trained FL AIML intermediate model; and sending, by the first security entity to the (Continued)

network node, third information associated with a training of
the trained FL AIML intermediate model.

16 Claims, 9 Drawing Sheets

(56)                    References Cited

U.S. PATENT DOCUMENTS

| | | | | |
|---|---|---|---|---|
| 2021/0273973 | A1* | 9/2021 | Boyer | H04L 63/1416 |
| 2021/0360027 | A1* | 11/2021 | Boyer | H04L 51/212 |
| 2023/0012220 | A1* | 1/2023 | Humphrey | G06F 21/53 |
| 2024/0289637 | A1* | 8/2024 | Lenga | G06N 3/045 |
| 2025/0068971 | A1* | 2/2025 | Kaga | G06N 20/20 |
| 2025/0225436 | A1* | 7/2025 | Wang | G06F 21/6245 |
| 2025/0301317 | A1* | 9/2025 | Li | H04W 12/06 |
| 2025/0310214 | A1* | 10/2025 | Ly | H04W 24/10 |
| 2025/0310776 | A1* | 10/2025 | Wang | H04L 63/14 |
| 2025/0317496 | A1* | 10/2025 | Li | H04L 67/06 |
| 2025/0323931 | A1* | 10/2025 | Roizman | H04L 63/1433 |

FOREIGN PATENT DOCUMENTS

| | | | | | |
|---|---|---|---|---|---|
| CN | 119886826 | A | * | 4/2025 | G06N 3/048 |
| CN | 120087500 | A | * | 6/2025 | G06N 20/00 |
| WO | WO 2021236551 | A1 | | 11/2021 | |
| WO | WO-2024128456 | A1 | * | 6/2024 | G06F 11/3636 |

* cited by examiner

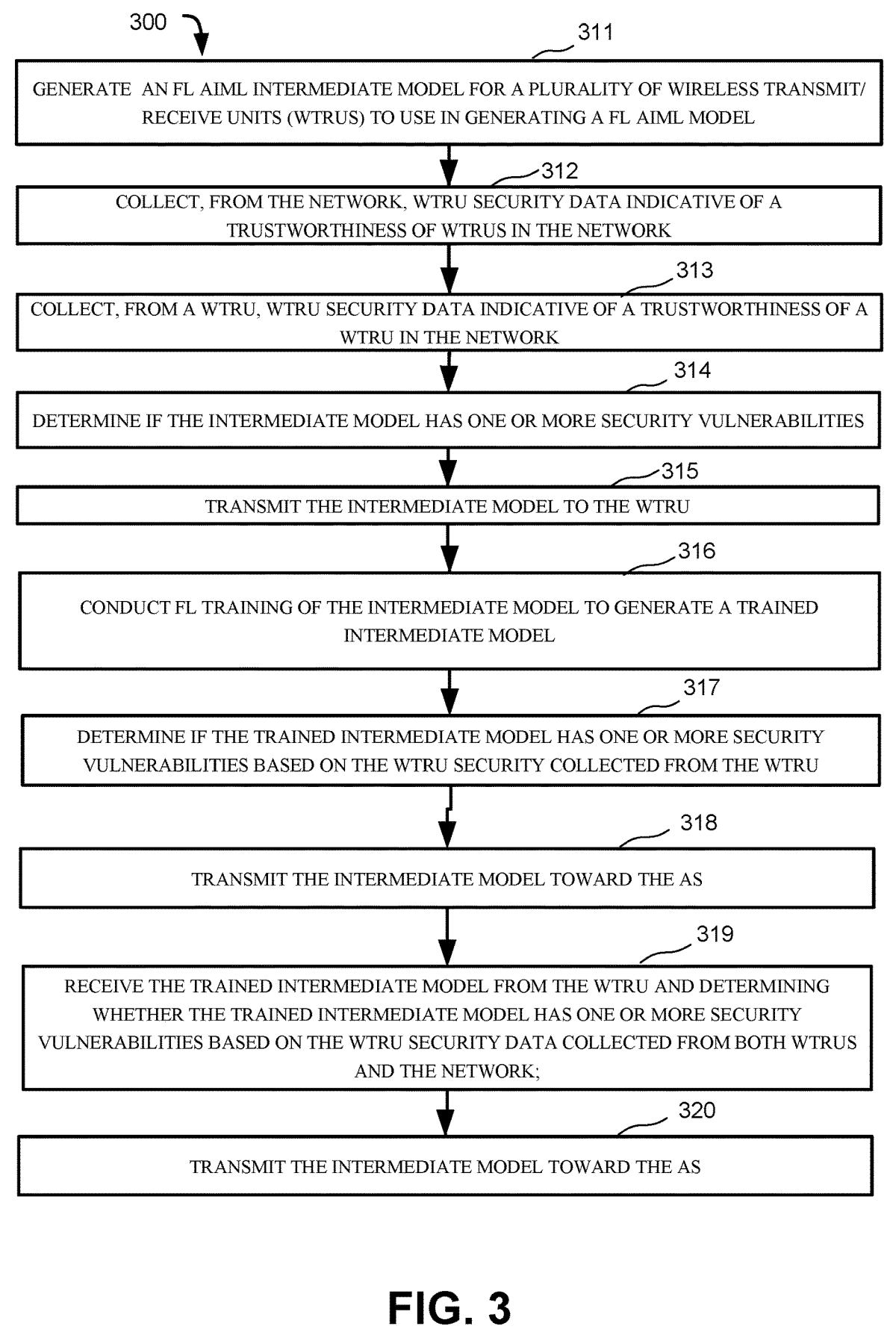

300

311

GENERATE AN FL AIML INTERMEDIATE MODEL FOR A PLURALITY OF WIRELESS TRANSMIT/ RECEIVE UNITS (WTRUS) TO USE IN GENERATING A FL AIML MODEL

312

COLLECT, FROM THE NETWORK, WTRU SECURITY DATA INDICATIVE OF A TRUSTWORTHINESS OF WTRUS IN THE NETWORK

313

COLLECT, FROM A WTRU, WTRU SECURITY DATA INDICATIVE OF A TRUSTWORTHINESS OF A WTRU IN THE NETWORK

314

DETERMINE IF THE INTERMEDIATE MODEL HAS ONE OR MORE SECURITY VULNERABILITIES

315

TRANSMIT THE INTERMEDIATE MODEL TO THE WTRU

316

CONDUCT FL TRAINING OF THE INTERMEDIATE MODEL TO GENERATE A TRAINED INTERMEDIATE MODEL

317

DETERMINE IF THE TRAINED INTERMEDIATE MODEL HAS ONE OR MORE SECURITY VULNERABILITIES BASED ON THE WTRU SECURITY COLLECTED FROM THE WTRU

318

TRANSMIT THE INTERMEDIATE MODEL TOWARD THE AS

319

RECEIVE THE TRAINED INTERMEDIATE MODEL FROM THE WTRU AND DETERMINING WHETHER THE TRAINED INTERMEDIATE MODEL HAS ONE OR MORE SECURITY VULNERABILITIES BASED ON THE WTRU SECURITY DATA COLLECTED FROM BOTH WTRUS AND THE NETWORK;

320

TRANSMIT THE INTERMEDIATE MODEL TOWARD THE AS

FIG. 3

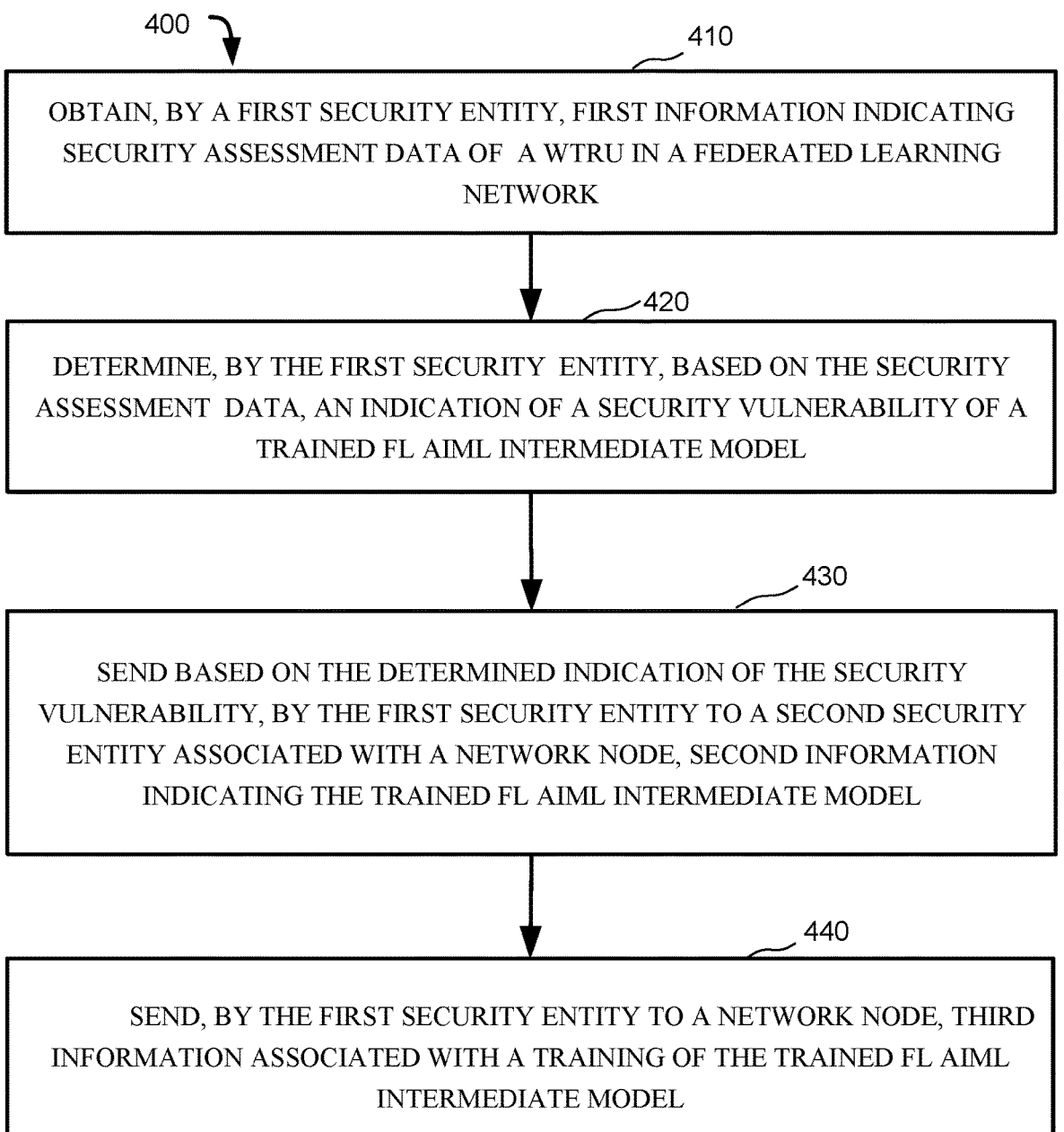

400

410

OBTAIN, BY A FIRST SECURITY ENTITY, FIRST INFORMATION INDICATING SECURITY ASSESSMENT DATA OF A WTRU IN A FEDERATED LEARNING NETWORK

420

DETERMINE, BY THE FIRST SECURITY ENTITY, BASED ON THE SECURITY ASSESSMENT DATA, AN INDICATION OF A SECURITY VULNERABILITY OF A TRAINED FL AIML INTERMEDIATE MODEL

430

SEND BASED ON THE DETERMINED INDICATION OF THE SECURITY VULNERABILITY, BY THE FIRST SECURITY ENTITY TO A SECOND SECURITY ENTITY ASSOCIATED WITH A NETWORK NODE, SECOND INFORMATION INDICATING THE TRAINED FL AIML INTERMEDIATE MODEL

440

SEND, BY THE FIRST SECURITY ENTITY TO A NETWORK NODE, THIRD INFORMATION ASSOCIATED WITH A TRAINING OF THE TRAINED FL AIML INTERMEDIATE MODEL

FIG. 4

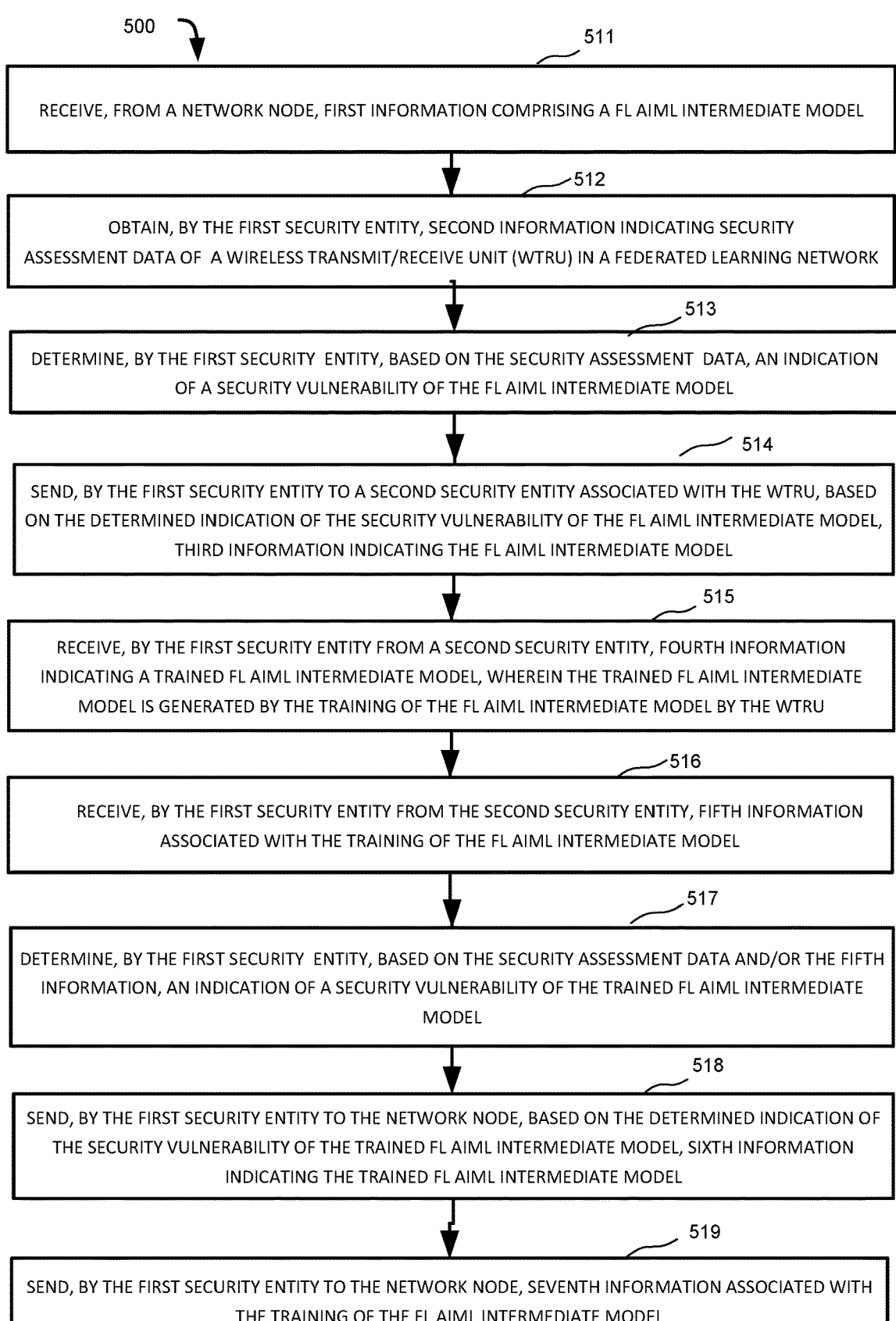

500

511

RECEIVE, FROM A NETWORK NODE, FIRST INFORMATION COMPRISING A FL AIML INTERMEDIATE MODEL

512

OBTAIN, BY THE FIRST SECURITY ENTITY, SECOND INFORMATION INDICATING SECURITY ASSESSMENT DATA OF A WIRELESS TRANSMIT/RECEIVE UNIT (WTRU) IN A FEDERATED LEARNING NETWORK

513

DETERMINE, BY THE FIRST SECURITY ENTITY, BASED ON THE SECURITY ASSESSMENT DATA, AN INDICATION OF A SECURITY VULNERABILITY OF THE FL AIML INTERMEDIATE MODEL

514

SEND, BY THE FIRST SECURITY ENTITY TO A SECOND SECURITY ENTITY ASSOCIATED WITH THE WTRU, BASED ON THE DETERMINED INDICATION OF THE SECURITY VULNERABILITY OF THE FL AIML INTERMEDIATE MODEL, THIRD INFORMATION INDICATING THE FL AIML INTERMEDIATE MODEL

515

RECEIVE, BY THE FIRST SECURITY ENTITY FROM A SECOND SECURITY ENTITY, FOURTH INFORMATION INDICATING A TRAINED FL AIML INTERMEDIATE MODEL, WHEREIN THE TRAINED FL AIML INTERMEDIATE MODEL IS GENERATED BY THE TRAINING OF THE FL AIML INTERMEDIATE MODEL BY THE WTRU

516

RECEIVE, BY THE FIRST SECURITY ENTITY FROM THE SECOND SECURITY ENTITY, FIFTH INFORMATION ASSOCIATED WITH THE TRAINING OF THE FL AIML INTERMEDIATE MODEL

517

DETERMINE, BY THE FIRST SECURITY ENTITY, BASED ON THE SECURITY ASSESSMENT DATA AND/OR THE FIFTH INFORMATION, AN INDICATION OF A SECURITY VULNERABILITY OF THE TRAINED FL AIML INTERMEDIATE MODEL

518

SEND, BY THE FIRST SECURITY ENTITY TO THE NETWORK NODE, BASED ON THE DETERMINED INDICATION OF THE SECURITY VULNERABILITY OF THE TRAINED FL AIML INTERMEDIATE MODEL, SIXTH INFORMATION INDICATING THE TRAINED FL AIML INTERMEDIATE MODEL

519

SEND, BY THE FIRST SECURITY ENTITY TO THE NETWORK NODE, SEVENTH INFORMATION ASSOCIATED WITH THE TRAINING OF THE FL AIML INTERMEDIATE MODEL

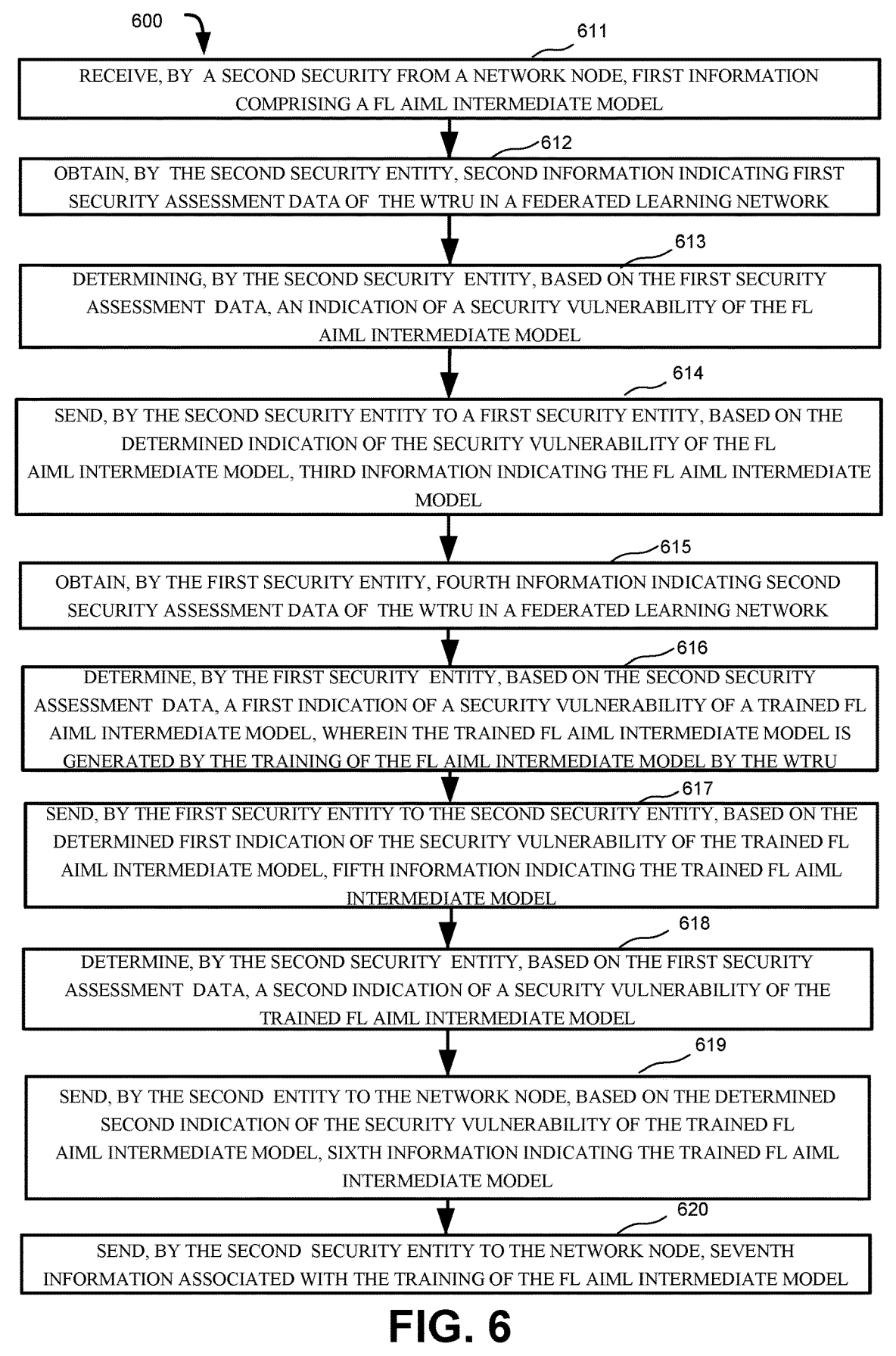

RECEIVE, BY A SECOND SECURITY FROM A NETWORK NODE, FIRST INFORMATION COMPRISING A FL AIML INTERMEDIATE MODEL

612

OBTAIN, BY THE SECOND SECURITY ENTITY, SECOND INFORMATION INDICATING FIRST SECURITY ASSESSMENT DATA OF THE WTRU IN A FEDERATED LEARNING NETWORK

613

DETERMINING, BY THE SECOND SECURITY ENTITY, BASED ON THE FIRST SECURITY ASSESSMENT DATA, AN INDICATION OF A SECURITY VULNERABILITY OF THE FL AIML INTERMEDIATE MODEL

614

SEND, BY THE SECOND SECURITY ENTITY TO A FIRST SECURITY ENTITY, BASED ON THE DETERMINED INDICATION OF THE SECURITY VULNERABILITY OF THE FL AIML INTERMEDIATE MODEL, THIRD INFORMATION INDICATING THE FL AIML INTERMEDIATE MODEL

615

OBTAIN, BY THE FIRST SECURITY ENTITY, FOURTH INFORMATION INDICATING SECOND SECURITY ASSESSMENT DATA OF THE WTRU IN A FEDERATED LEARNING NETWORK

616

DETERMINE, BY THE FIRST SECURITY ENTITY, BASED ON THE SECOND SECURITY ASSESSMENT DATA, A FIRST INDICATION OF A SECURITY VULNERABILITY OF A TRAINED FL AIML INTERMEDIATE MODEL, WHEREIN THE TRAINED FL AIML INTERMEDIATE MODEL IS GENERATED BY THE TRAINING OF THE FL AIML INTERMEDIATE MODEL BY THE WTRU

617

SEND, BY THE FIRST SECURITY ENTITY TO THE SECOND SECURITY ENTITY, BASED ON THE DETERMINED FIRST INDICATION OF THE SECURITY VULNERABILITY OF THE TRAINED FL AIML INTERMEDIATE MODEL, FIFTH INFORMATION INDICATING THE TRAINED FL AIML INTERMEDIATE MODEL

618

DETERMINE, BY THE SECOND SECURITY ENTITY, BASED ON THE FIRST SECURITY ASSESSMENT DATA, A SECOND INDICATION OF A SECURITY VULNERABILITY OF THE TRAINED FL AIML INTERMEDIATE MODEL

619

SEND, BY THE SECOND ENTITY TO THE NETWORK NODE, BASED ON THE DETERMINED SECOND INDICATION OF THE SECURITY VULNERABILITY OF THE TRAINED FL AIML INTERMEDIATE MODEL, SIXTH INFORMATION INDICATING THE TRAINED FL AIML INTERMEDIATE MODEL

620

SEND, BY THE SECOND SECURITY ENTITY TO THE NETWORK NODE, SEVENTH INFORMATION ASSOCIATED WITH THE TRAINING OF THE FL AIML INTERMEDIATE MODEL

FIG. 6

METHODS AND APPARATUS FOR ENHANCED SECURITY IN FEDERATED LEARNING MACHINE LEARNING OPERATIONS IN A COMMUNICATION NETWORK

CROSS-REFERENCE TO RELATED APPLICATIONS

This application is U.S. National Stage Application under 35 U.S.C. § 371 of International Patent Application No. PCT/US2023/011933, filed Jan. 31, 2023, which claims the benefit of U.S. Provisional Patent Application No. 63/305,941 filed Feb. 2, 2022, which is incorporated herein by reference.

FIELD

This disclosure pertains to methods and apparatus for enhancing security during federated learning machine learning operations in a communication network.

BRIEF DESCRIPTION OF THE DRAWINGS

A more detailed understanding may be had from the detailed description below, given by way of example in conjunction with the drawings appended hereto. Figures in such drawings, like the detailed description, are exemplary. As such, the Figures and the detailed description are not to be considered limiting, and other equally effective examples are possible and likely. Furthermore, like reference numerals ("ref.") in the Figures ("FIGs.") indicate like elements, and wherein:

FIG. 3 is a flowchart illustrating a representative method for enhancing security in federated learning (FL) artificial intelligence machine learning (AIML) performed in a communication network;

FIG. 4 is a flowchart illustrating a representative method for FL AIML implemented in a first security entity associated with a WTRU;

FIG. 5 is a flowchart illustrating a representative method for FL AIML implemented in a first security entity associated with a network node; and FIG. 6 is a flowchart illustrating a representative method for FL AIML implemented in a network system comprising a first security entity associated with a WTRU and a second security entity associated with a network node.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components, and circuits have not been described in detail, so as not to obscure the following description. Further, embodiments and examples not specifically described herein may be practiced in lieu of, or in combination with, the embodiments and other examples described, disclosed, or otherwise provided explicitly, implicitly and/or inherently (collectively "provided") herein.

Example Communication Systems

The methods, apparatuses and systems provided herein are well-suited for communications involving both wired and wireless networks. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
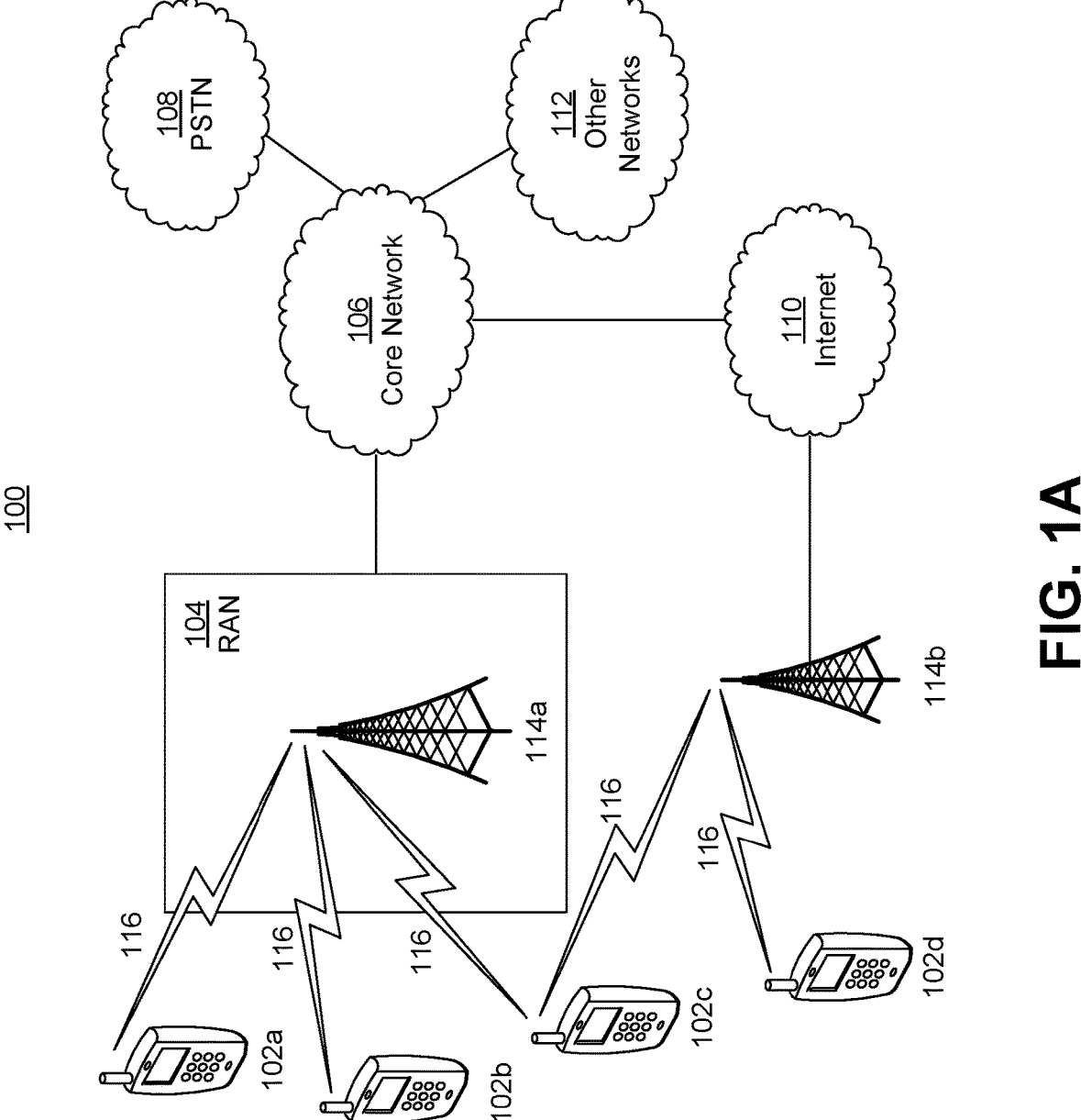
FIG. 1A is a system diagram illustrating an example communications system in which one or more disclosed embodiments may be implemented.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in an embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In an embodiment, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
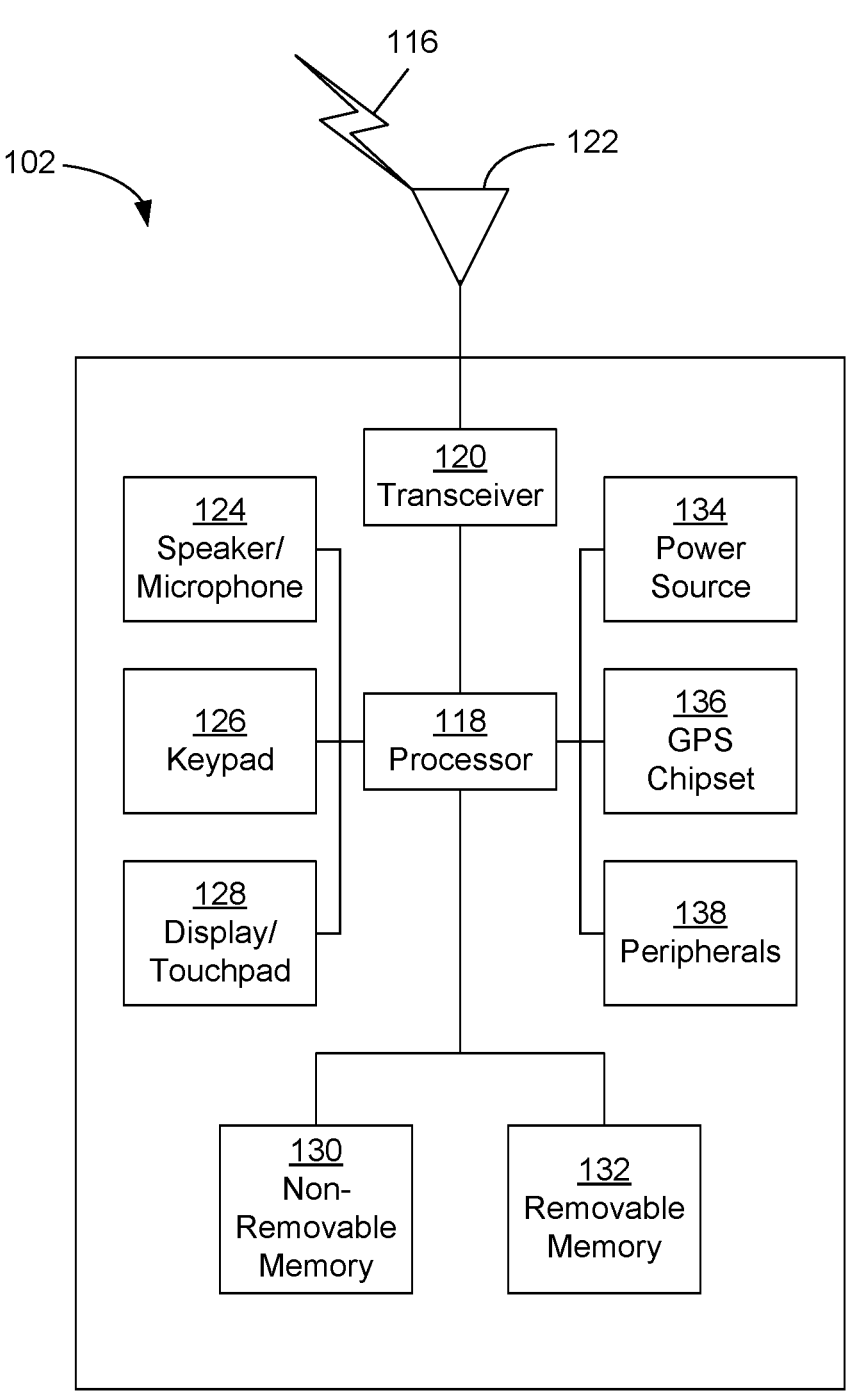
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals.

It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
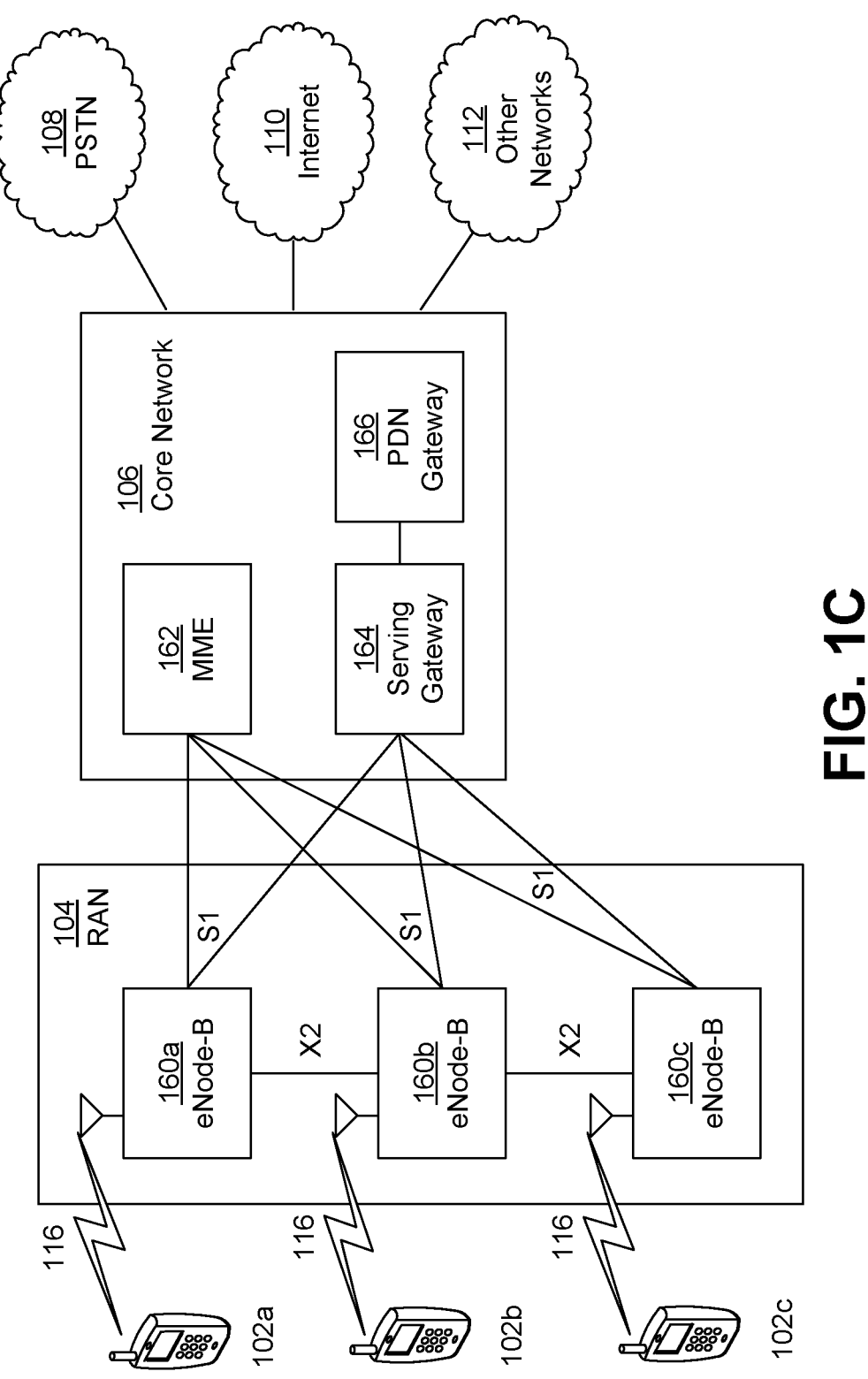
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The ISS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
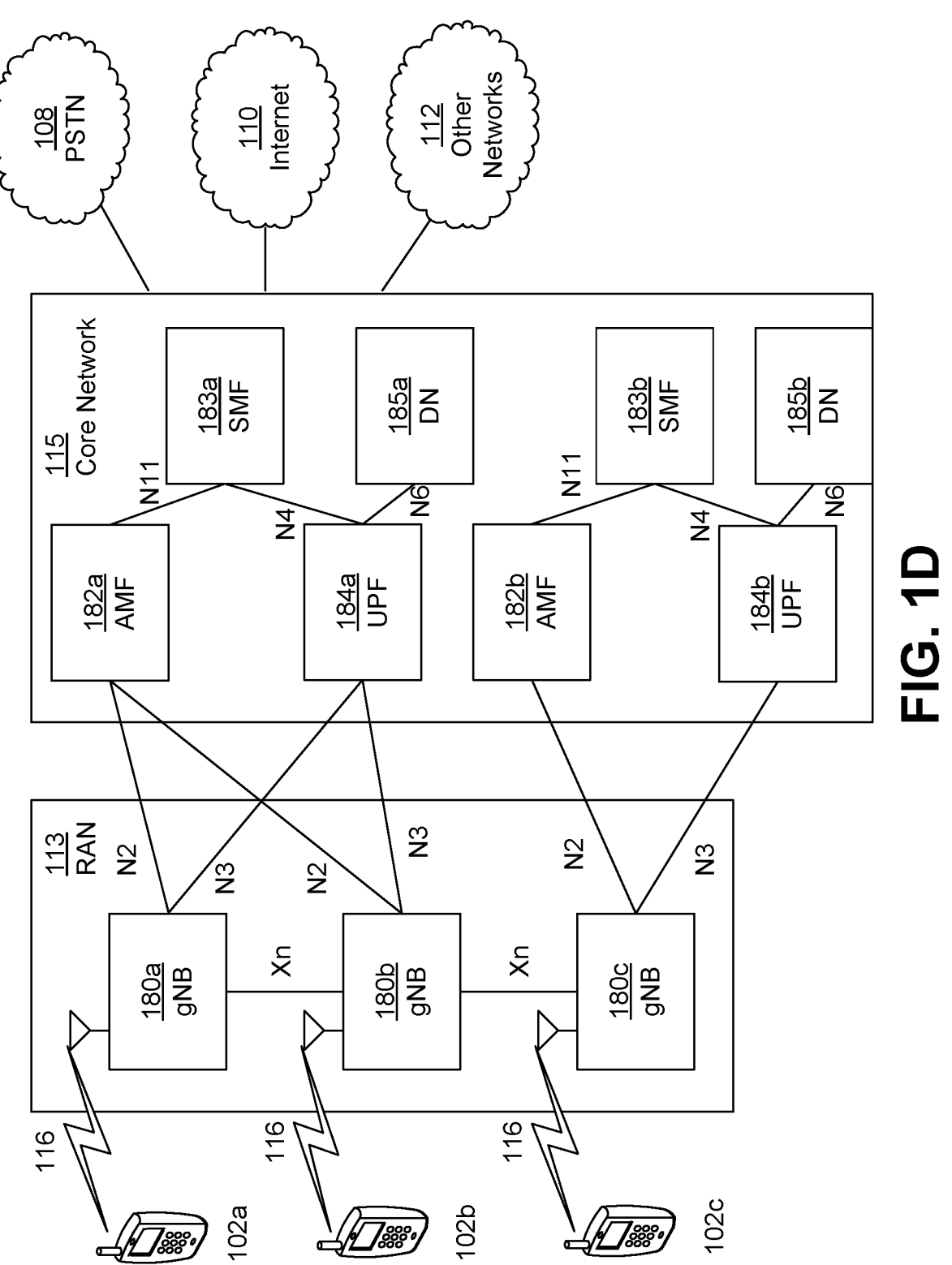
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In an embodiment, the gNBs 180a, 180b, 180c may implement MIMO technology. For example, gNBs 180a, 180b may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., including a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184a, 184b, routing of control plane information towards access and mobility management functions (AMFs) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one session management function (SMF) 183a, 183b, and at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In an embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Security for Federated Learning Applications

Federated learning is a machine learning technique that trains an algorithm across multiple decentralized edge devices or servers holding local data samples, without exchanging them. Federated learning allows a plurality of users to build a machine learning model without sharing data.

Federated learning enables multiple participants to construct an Artificial Intelligence/Machine Learning (AIML) learning model without sharing their private training data with each other. For example, multiple WTRUs can jointly train a WTRU based application without revealing what individual user's interaction. Federated models are then created by aggregating model updates submitted by participants. To protect confidentiality of the training data, the Application Server (AS) by design may not have visibility into how these updates are generated.

Federated learning may be vulnerable to a model-poisoning attack that is significantly more powerful than poisoning attacks that target (e.g., only) the training data. A malicious participant can carry out many AIML attacks, such as by using model replacement to introduce backdoor functionality into the joint model or using contaminated data to train the AI/ML system that will be merged into the joint model. These attacks can be performed by a single participant or multiple colluding WTRUs.

With a Federated Learning (FL) training model, an AS may (e.g., be triggered to) select a set of WTRUs/devices to participate in a distributed training session. Every training session may include several training cycles. For any (e.g., each) cycle, any (e.g., each) selected WTRU may receive (e.g., information indicating) the intermediate model from the server, may train it with the WTRU environmental attributes and/or local data, and may submit the trained intermediate model back to the application server. The application server may aggregate any number of (e.g., all) the intermediate models received from any number of (e.g., all) the participating WTRUs and may produce the new model for the next cycle of FL.

Vulnerability in an intermediate FL model submitted by one endpoint can impact the overall AI model. When participating WTRUs submit an intermediate trained model to the application server, the trained model should be scrutinized before the data reaches the FL application server to avoid potential security risk to the final trained model, such as model training data poisoning attacks, sybils attacks, data privacy attacks, model extraction attacks, etc.

Federated learning introduces potentially more serious threats than regular AIML. Particularly, a client that previously acted (e.g., only) as a passive data provider can now access the intermediate model it received and submit arbitrary updates to be aggregated into the global model as part of the federated learning process. This may create an opportunity for a malicious client to manipulate the training process with little restriction. In particular, malicious actors posing as honest clients can send erroneous updates that maliciously influence the properties of the trained model. This scheme is known as model poisoning. Since the AS is unable to view client training data and does not have a validation dataset, the AS may not easily verify which client data updates are genuine.

This specification discloses techniques, methods and apparatus to minimize the risk and threat from an intermediate model submitted by a WTRU that may participate in the FL. Further, it discloses techniques, methods, and apparatus to dynamically evaluate the security vulnerability integrated in an intermediate FL model and/or to utilize AI/ML as a security analytic to evaluate and scrutinize an intermediate model submitted by a WTRU.

In an embodiment to be described hereinbelow, a security evaluation engine may integrate the agent input from the WTRU and/or the network data to perform a security assessment of the intermediate model FL learned by the WTRU. In an embodiment, the input for the evaluation may include any of: the WTRU training data, WTRU behavior, security intelligence, LOGs and history, network Security Information and Event Management (SIEM) data, the AIML model that will be used to perform the security assessment, etc. The outputs from the evaluation and assessment may be used to decide whether the intermediate model can be merged into the final model.

In accordance with an embodiment, a module (herein termed the Security Analytics Engine or SAE) may (e.g., dynamically) evaluate and assess the security of an intermediate FL model submitted by the participating WTRU to assure there is no security vulnerability in the intermediate model trained by the candidate WTRU so that there is no potential security risk to the merged AI/ML model when integrating the intermediate model. The data source and/or analytics used by the Security Analytics Engine may be taken from the security analytics functionality in the AIML agents that are integrated in the WTRU, where, in an embodiment, the WTRU behavior and history, reputation, referrals, etc., along with the network data may be used to perform the security assessment. The agent may be part of the 3GPP AI/ML enabling framework and may support any number of (e.g., all) FL ASs. The network and host security posture may be analyzed (e.g., together) with the WTRU analytics from the Client Security Analytics Engine.

In accordance with an embodiment, the threat detection process may be performed in a case where (e.g., as soon as) the WTRU submits the intermediate model, for example, using data collected from the WTRU agent along with data available (e.g., only) from the network, such as intermediate models submitted by other WTRUs. The Security Analytics Engine can detect sybil poisoning attacks that may be the outcome from multiple malicious WTRUs collusion.

Security Analytics Engine may be placed at both the WTRU side and the network side, and may perform any of the following tasks:

1. Screening the trained intermediate model received from the WTRU for security vulnerabilities and threats;

2. Using any of the: (1) WTRU models, (2) internet intelligence, (3) AIML application specific attack models detection, (4) WTRU data including logs, and (4) FL input to the intermediate model, e.g., training vectors, the Security Analytics Engine may perform the security assessment on the trained FL intermediate model;

3. The security agent in the WTRU may be responsible for collecting data that is in the WTRU end point, for example in addition to the data from the network, to assist the security evaluation;

4. The Security Analytics Engine may perform its monitoring, evaluation, and/or decision-making functions using Machine Learning and Artificial Intelligence;

5. The Security Analytics Engine at the network side may perform threat detection on the trained intermediate models received from WTRUs. The inputs for this network-side SAE may be taken from the network using data available (e.g., only) from network, such as any of: any number of (e.g., all) WTRU models, internet intelligence, AIML application specific attack models detection, etc. For example, with the assistance of AIML algorithms, this network-side SAE may detect threats, such as sybil poisoning attacks, that may involve the collusion of multiple malicious WTRUs.

Figure 2:
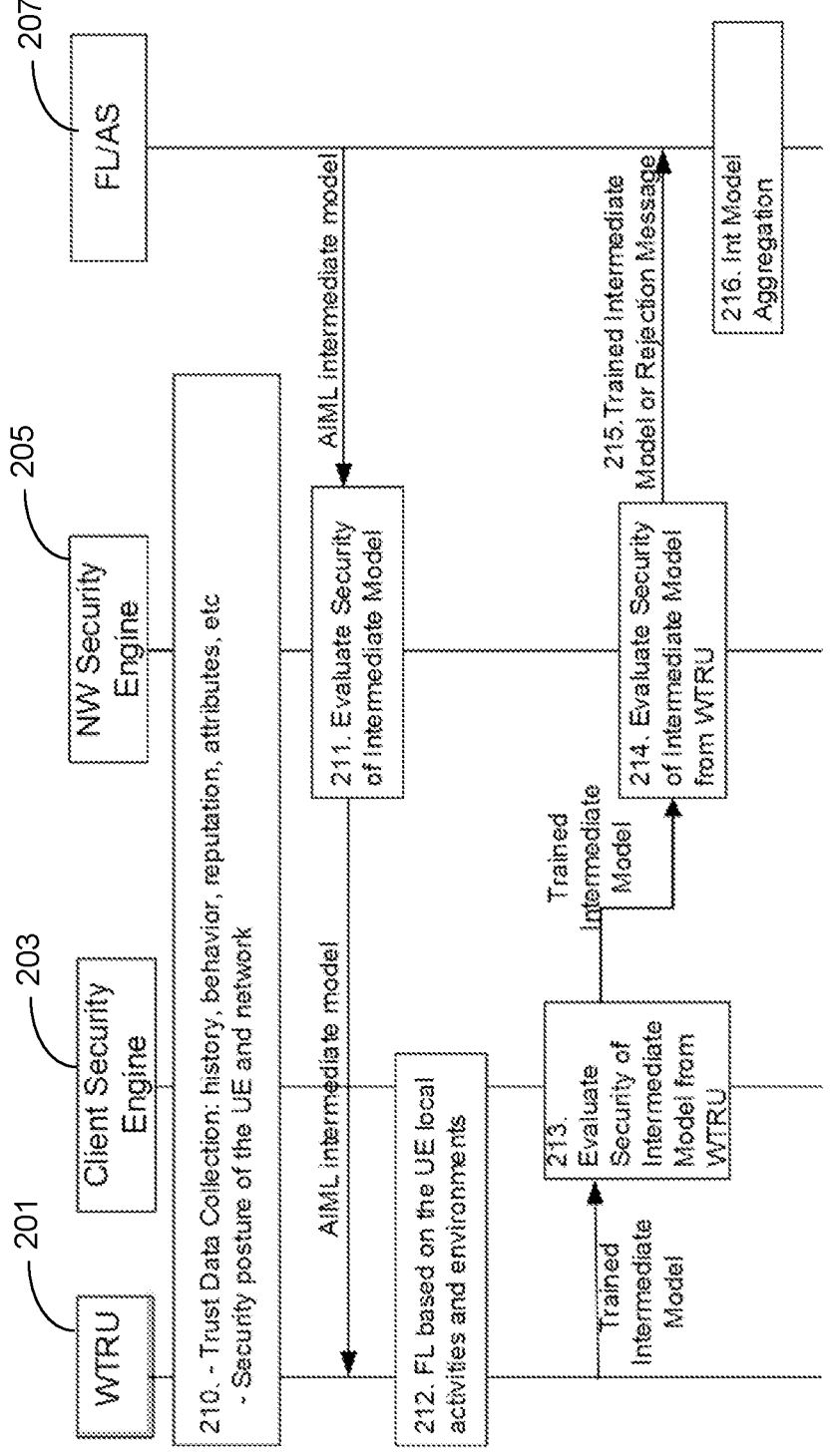
FIG. 2 is a signal flow diagram illustrating signal flow for developing a federated learning machine learning model with enhanced security in accordance with an embodiment.

FIG. 2 is a flow diagram illustrating signal flow and operations in accordance with an embodiment. The relevant nodes/services as shown in FIG. 2 are the WTRU 201, the client-side SAE 203, the network-side SAE 205 and the Application Server 207 that manages the federated learning.

At step 210, (e.g., both) the client-side Security Analytics Engine 203 and the network-side Security Analytics Engine 205 may collect WTRU data, including for example security data, that will be used to evaluate the security of that WTRU during candidate selection for the FL. The two Security Analytics Engines may exchange and share data between them. The client-side data set may include any of, but is not limit to: (1) WTRU history as an AIML client, (2) WTRU behavior and/or feedback as a past AIML client, (3) WTRU reputation when collaborating with other WTRUs and AIML ASs, (4) the WTRU's security posture (such as security software patches, security capability, hardware capability, etc.), and/or (5) the training vectors that WTRU uses to train the intermediate model. The network-side SAE 205 may collect data (e.g., data available (e.g., only) in the network).

It should be understood that, although step 210 is shown at a particular location in the flow diagram, in actuality, for either or both of the SAEs 203 and 205, this data collection may be a continuous operation (or, at least, performed at various different times, irrespective of the other steps shown in FIG. 2).

At step 211, the application server managing the federated learning model 207 may send (e.g., information indicating) an intermediate AIML model to the WTRUs that may have been selected as the FL candidates for the next round of FL. The AS may send (e.g., information indicating) this untrained intermediate model to the WTRUs, for example, through the network-side SAE 205. The network-side Security Analytics Engine 205 may evaluate the security of the intermediate model for potential AIML vulnerabilities that can be utilized by a malicious WTRU to launch AIML model attacks on the model, such as data privacy attack, model extraction attacks, etc. If the network-side SAE 205 detects such vulnerabilities, it may reject the intermediate model and may inform (e.g., transmit information indicating) the AS 207 that the intermediate model has security vulnerabilities (this outcome is not shown in FIG. 2 in order not to obfuscate the drawing). Otherwise, the network-side SAE 205 may forward (e.g., transmit information indicating) the intermediate AIML model to the WTRUs (this outcome is shown in FIG. 2).

At step 212, the WTRU client may (e.g., start to) train the FL using the received intermediate model. During the training, the user parameters, logs, and training vectors may be recorded, for example, by the client-side Security Analytics Engine 203.

At step 213, in a case where (e.g., after) the AIML client finishes the FL training, the client-side Security Analytics Engine 203 in the WTRU may (e.g., start to) screen the security vulnerability of the newly trained intermediate model from the WTRU, for example, using the input data collected in step 210 and/or the data collected in step 212 during the training of the intermediate model. The Security Analytics Engine 203 may use AI-based algorithms to perform the screening. If the client-side SAE 203 detects a security vulnerability with trained intermediate model, it may reject the model without sending it to the AS 207.

In step 214, the network-side SAE 205 may receive (e.g., information indicating) the intermediate model from the WTRUs and may perform a second, network-side threat detection on the trained intermediate models received from WTRUs. The inputs for this detection may be from the network side using additional data that may be (e.g., only) available from network, such as any of: any number of (e.g., all) WTRU models, internet intelligences, AIML application specific attack models detection, etc. With the use of AIML algorithms, the network-side SAE 205 may detect threats such as sybil poisoning attacks that may use multiple malicious WTRUs to collude.

At step 215, the network-side SAE 205 may send (e.g., information indicating) the finished intermediate model to the AS 207, if it does not detect any security vulnerability. Otherwise, the network-side Security Analytics Engine may send a rejection message to the AS, for example with an error code, to indicate that the trained intermediate model had security vulnerabilities, for example without sending the finished intermediate model to the AS.

In step 216, the AS 207 may collect any number of (e.g., all) the intermediate models from any number of (e.g., all) participating WTRUs and may aggregate them into the global model and/or an intermediate model for the next round of FL training.

FIG. 3 is a flowchart illustrating a representative method 300 for enhancing security in FL AIML performed in a communication network.

Referring to FIG. 3, a representative method 300 may include, at block 311, an AS 207 generating an FL AIML intermediate model for a plurality of WTRUs to use in generating a FL AIML model. At block 312, a network-side security engine 205 may collect, from the network, WTRU security data indicative of a vulnerability of WTRUs in the network. At block 313, a client-side security engine 203 may collect, from a WTRU 201, WTRU security data indicative of a vulnerability of a WTRU in the network. At block 314, the network-side security engine 205 may determine if the intermediate model has one or more security vulnerabilities. At block 315, if the network-side security engine 205 determines that the intermediate model does not have a security vulnerability, the network-side security engine 205 may transmit the intermediate model to the WTRU 201. If the network-side security engine 205 determines that the intermediate model does have a security vulnerability, the network-side security engine 205 preventing transmission of the intermediate model to the WTRU 201. At block 316, responsive to receiving the intermediate model, the WTRU 201 may conduct FL training of the intermediate model to generate a trained intermediate model. At block 317, the client-side security engine 203 may determine if the trained intermediate model has one or more security vulnerabilities based on the WTRU security collected from the WTRU 201. At block 318, if the client-side security engine 203 determines that the trained intermediate model does not have a security vulnerability, the client-side security engine 203 may transmit the intermediate model toward the AS 207. If the client-side security engine 203 determines that the intermediate model has a security vulnerability, the client-side security engine 203 may prevent transmission of the trained intermediate model toward the AS 207. At block 319, the network-side security engine 205 may receive the trained intermediate model from the WTRU 201 and may determine whether the trained intermediate model has one or more security vulnerabilities based on the WTRU security data collected from both WTRUs and the network. At block 320, if the trained intermediate model is determined to not have a security vulnerability, the network-side security engine 205 may transmit the intermediate model toward the AS 207. If the intermediate model is determined to have a security vulnerability, the network-side security engine 205 may prevent transmission of the trained intermediate model toward the AS 207.

In certain representative embodiments, the WTRU security data from the WTRU 201 may comprise any of WTRU history as an AIML client, WTRU behavior and feedback as a past AIML client, WTRU reputation when collaborating with other WTRUs and AIML ASs, WTRU security posture, security software patches at the WTRU, security capabilities of the WTRU, and hardware capabilities of the WTRU 201.

In certain representative embodiments, the WTRU security data from the WTRU 201 may comprise any of WTRU history as an AIML client, WTRU behavior and feedback as a past AIML client, WTRU reputation when collaborating with other WTRUs and AIML ASs, WTRU security posture, security software patches at the WTRU, security capabilities of the WTRU, and hardware capabilities of the WTRU 201.

In certain representative embodiments, the WTRU security data from the network may comprise any of trained intermediate models of a plurality of WTRUs, internet intelligences, and AIML application specific attack models detection.

In certain representative embodiments, the security engines use AIML to determine the security vulnerabilities.

In certain representative embodiments, the method may further comprise the AS 207 receiving trained intermediate models from a plurality of other WTRUs in the network; and/or the AS 207 generating a global FL AIML model based on the trained intermediate models received from the WTRU 201 and the other WTRUs.

FIG. 4 is a flowchart illustrating a representative method 400 for FL AIML implemented in a first security entity 203 associated with a WTRU 201.

Referring to FIG. 4, the representative method 400 may include, at block 410, obtaining, by the first security entity 203, first information indicating security assessment data of the WTRU 201 in a federated learning network. At block 420, the first security entity may determine, based on the security assessment data, an indication of a security vulnerability of a trained FL AIML intermediate model. At block 430, the representative method 400 may include sending based on the determined indication of the security vulnerability, by the first security entity 203 to a second security entity 205 associated with a network node 207, second information indicating and/or comprising the trained FL AIML intermediate model. At block 440, the representative method 400 may include sending, by the first security entity 203 to the network node 207, third information associated with a training of the trained FL AIML intermediate model.

In certain representative embodiments, the representative method 400 may comprise: storing, by the first security entity 203, the third information during a training of the trained FL AIML intermediate model by the WTRU 201.

In certain representative embodiments, the representative method 400 may comprise: receiving, from the network node 207, information comprising the FL AIML intermediate model.

In certain representative embodiments, the third information may comprise any of: a WTRU user parameters, WTRU logs, and/or training vectors.

In certain representative embodiments, the representative method 400 may comprise: determining, by the first security entity, based on the third information, the indication of a security vulnerability of the trained FL AIML intermediate model.

In certain representative embodiments, the first security entity 203 may use AIML to determine the indication of a security vulnerability of the trained FL AIML intermediate model.

In certain representative embodiments, the security assessment data may comprise any of: (1) at least one of WTRU history as an AIML client, (2) WTRU behavior and feedback as a past AIML client, (3) WTRU reputation when collaborating with other WTRUs and AIML application server, (4) WTRU security posture, (5) security software patches at the WTRU, (6) security capabilities of the WTRU, (7) hardware capabilities of the WTRU 201, and/or (8) training vectors that are used to train the intermediate model.

In certain representative embodiments, the first security entity 203 may be implemented in the WTRU 201 and/or in an edge network.

In certain representative embodiments, the network node 207 may be an AS.

FIG. 5 is a flowchart illustrating a representative method 500 for FL AIML implemented in a first security entity 205 associated with a network node 207.

Referring to FIG. 5, the representative method 500 may include, at block 511, receiving, from the network node 207, first information comprising a FL AIML intermediate model. At block 512, the first security entity 205 may obtain second information indicating security assessment data of a WTRU 201. At block 513, the first security entity 205 may determine, based on the security assessment data, an indication of a security vulnerability of the FL AIML intermediate model. At block 514, the first security entity 205 may send to a second security entity 203 associated with the WTRU 201, based on the determined indication of the security vulnerability of the FL AIML intermediate model, third information indicating the FL AIML intermediate model. At block 515, the first security entity 205 may receive from the second security entity, fourth information indicating a trained FL AIML intermediate model, wherein the trained FL AIML intermediate model may be generated by the training of the FL AIML intermediate model by the WTRU. At block 516, the first security entity 205 may receive, from the second security entity 203, fifth information associated with the training of the FL AIML intermediate model. At block 517, the first security entity 205 may determine, based on the security assessment data and/or the fifth information, an indication of a security vulnerability of the trained FL AIML intermediate model. At block 518, the first security entity 205 may send to the network node 207, based on the determined indication of the security vulnerability of the trained FL AIML intermediate model, sixth information indicating the trained FL AIML intermediate model. At block 519, the first security entity 205 may send to the network node 207, seventh information associated with the training of the FL AIML intermediate model.

In certain representative embodiments, the first security entity 205 may use AIML to determine the indication of a security vulnerability of the trained FL AIML intermediate model.

In certain representative embodiments, the second security entity 203 may be implemented in the WTRU 201 and/or in an edge network.

In certain representative embodiments, the network node 207 may be an AS.

In certain representative embodiments, the second information indicating security assessment data comprises at least one of: trained FL AIML intermediate models of a plurality of WTRUs, internet intelligences, and AIML application attack detection models.

FIG. 6 is a flowchart illustrating a representative method 600 for FL AIML implemented in a network system comprising a first security entity 203 associated with a WTRU 201, and a second security entity 205 associated with a network node 207.

Referring to FIG. 6, the representative method 600 may include, at block 611, receiving, by the second security entity from the network node, first information comprising a FL AIML intermediate model. At block 612, the second security entity 205 may obtain second information indicating first security assessment data of the WTRU 201 in a federated learning network. At block 613, the second security entity 205 may determine, based on the first security assessment data, an indication of a security vulnerability of the FL AIML intermediate model. At block 614, the second security entity 205 may send to the first security 203 entity, based on the determined indication of the security vulnerability of the FL AIML intermediate model, third information indicating the FL AIML intermediate model. At block 615, the first security entity 203 may obtain fourth information indicating second security assessment data of the WTRU in a federated learning network. At block 616, the first security entity 203 may determine, based on the second security assessment data, a first indication of a security vulnerability of a trained FL AIML intermediate model, wherein the trained FL AIML intermediate model is generated by the training of the FL AIML intermediate model by the WTRU 201. At block 617, the first security entity 203 may send to the second security 205 entity, based on the determined first indication of the security vulnerability of the trained FL AIML intermediate model, fifth information indicating the trained FL AIML intermediate model. At block 618, the second security entity 205 may determine, based on the first security assessment data, a second indication of a security vulnerability of the trained FL AIML intermediate model. At block 619, the second security entity 205 may send to the network node 207, based on the determined second indication of the security vulnerability of the trained FL AIML intermediate model, sixth information indicating the trained FL AIML intermediate model. At block 620, the second security entity 205 may send, to the network node 207, seventh information associated with the training of the FL AIML intermediate model.

In certain representative embodiments, the first security entity 203 may be implemented in the WTRU 201 and/or in an edge network.

In certain representative embodiments, the network node 207 may be an AS.

In certain representative embodiments, the representative method 600 may comprise: aggregating, by the network node 207, the trained FL AIML intermediate model with at least a further trained FL AIML intermediate model obtained from a plurality of WTRUs.

Conclusion

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of wireless communication capable devices, (e.g., radio wave emitters and receivers). However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

The invention claimed is:

1. A method for federated learning (FL) artificial intelligence machine learning (AIML) implemented in a first device associated with a wireless transmit/receive unit (WTRU), the method comprising:

obtaining first information indicating security assessment data of the WTRU in a federated learning network;

obtaining second information associated with a training of a trained FL AIML intermediate model, wherein the second information comprises any of one or more WTRU logs and one or more training vectors;

determining based on the security assessment data and the second information, an indication of a security vulnerability of the trained FL AIML intermediate model; and sending the second information and third information a second device based on the indication, wherein the second device is associated with a network node, and wherein the third information indicates the trained FL AIML intermediate model.

2. The method according to claim 1, further comprising: storing the second information during a training of the trained FL AIML intermediate model by the WTRU.

3. The method according to claim 1, further comprising: receiving fourth information from the network node, wherein the fourth information comprises the FL AIML intermediate model.

4. The method according to claim 1, wherein the third second information comprises one or more parameters associated with a user of the WTRU.

5. The method according to claim 1, wherein determining, based on the security assessment data and the second information, an indication of a security vulnerability of the trained FL AIML intermediate model comprises using AIML to determine the indication.

6. The method according to claim 1, wherein the security assessment data comprises any of: (1) a history of AIML client operation by the WTRU, (2) behavior and feedback data associated with past AIML client operation by the WTRU, (3) data indicating a reputation of the WTRU based on collaboration with other WTRUs and an AIML application server, (4) security posture associated with the WTRU, (5) one or more security software patches at the WTRU, (6) data indicating one or more security capabilities of the WTRU, (7) data indicating one or more hardware capabilities of the WTRU, and (8) data indicating one or more training vectors used to train the trained FL AIML intermediate model.

7. The method according to claim 1, wherein the first device is implemented as an entity of the WTRU or as an element of an edge network.

8. The method according to claim 1, further comprising sending the trained FL AIML intermediate model to the network node to be aggregated with a plurality of trained FL AIML intermediate models to form a global model.

9. A first device configured for federated learning (FL) artificial intelligence machine learning (AIML), wherein the first device is associated with a wireless transmit/receive unit (WTRU), and wherein the first device comprises a processor and a transmitter/receiver unit configured to:

obtain first information indicating security assessment data of the WTRU in a federated learning network;

obtaining second information associated with a training of a trained FL AIML intermediate model, wherein the second information comprises any of one or more WTRU logs and one or more training vectors, determine based on the security assessment data and the second information, an indication of a security vulnerability of the trained FL AIML intermediate model; and send the second information and third information to a second device based on the indication, wherein the second device is associated with a network node, and wherein the third information indicates the trained FL AIML intermediate model.

10. The first device according to claim 9, wherein the processor is further configured to: store the second information during a training of the trained FL AIML intermediate model by the WTRU.

11. The first device according to claim 9 wherein the processor is further configured to: receive, from the network node, information comprising the FL AIML intermediate model.

12. The first device according to claim 9 wherein the second information comprises one or more parameters associated with a user of the WTRU.

13. The first device according to claim 9, wherein the first device is configured to determine, based on the security assessment data and the second information, an indication of a security vulnerability of the trained FL AIML intermediate model using AIML to determine the indication.

14. The first device according to claim 9, wherein the security assessment data comprises any of: (1) a WTRU history of AIML client operation by the WTRU, (2) behavior and feedback data associated with past AIML client operation by the WTRU, (3) data indicating a reputation of the WTRU based on collaboration with other WTRUs and an AIML application server, (4) security posture associated with the WTRU, (5) one or more security software patches at the WTRU, (6) data indicating one or more security capabilities of the WTRU, (7) data indicating one or more hardware capabilities of the WTRU, and (8) data indicating one or more training vectors used to train the FL AIML intermediate model.

15. The first devices according to claim 9, wherein the first device is implemented as an entity of the WTRU or as an element of an edge network.

16. The first device according to claim 9, further configured to send the trained FL AIML intermediate model to the network node to aggregate it with a plurality of trained FL AIML intermediate models to form a global model.

* * * * *